(12) United States Patent
Young et al.

(10) Patent No.: US 7,344,676 B2
(45) Date of Patent: Mar. 18, 2008

(54) HYDROGEN STORAGE MATERIALS HAVING EXCELLENT KINETICS, CAPACITY, AND CYCLE STABILITY

(75) Inventors: Kwo Young, Troy, MI (US); Michael A. Fetcenko, Rochester, MI (US); Taihei Ouchi, Rochester, MI (US); Jun Im, Troy, MI (US); Stanford R. Ovshinsky, Bloomfield Hills, MI (US); Feng Li, Troy, MI (US); Melanie Reinhout, Shelby Township, MI (US)

(73) Assignee: Ovonic Hydrogen Systems LLC, Rochester Hills, MI (US)

(*) Notice: Subject to any disclaimer, the term of this patent is extended or adjusted under 35 U.S.C. 154(b) by 0 days.

(21) Appl. No.: 10/741,222

(22) Filed: Dec. 19, 2003

(65) Prior Publication Data

US 2005/0135961 A1    Jun. 23, 2005

(51) Int. Cl.
*C22C 30/00* (2006.01)
*H01M 8/06* (2006.01)

(52) U.S. Cl. .................. 420/424; 420/900; 420/588; 429/20; 429/24

(58) Field of Classification Search ............. 148/669; 420/417, 421, 580, 424, 900, 588
See application file for complete search history.

(56) References Cited

U.S. PATENT DOCUMENTS

| | | | | | |
|---|---|---|---|---|---|
| 4,111,689 | A | * | 9/1978 | Liu ........................... | 420/580 |
| 4,160,014 | A | * | 7/1979 | Gamo et al. .............. | 423/644 |
| 4,358,316 | A | * | 11/1982 | Liu et al. ................... | 420/75 |
| 4,446,101 | A | * | 5/1984 | Bernauer et al. .......... | 420/424 |
| 4,457,891 | A | * | 7/1984 | Bernauer et al. .......... | 420/434 |
| 4,551,400 | A | * | 11/1985 | Sapru et al. ................ | 429/94 |
| 4,728,586 | A | * | 3/1988 | Venkatesan et al. ...... | 429/94 |
| 4,783,329 | A | * | 11/1988 | Maeland et al. .......... | 423/644 |
| RE34,588 | E | * | 4/1994 | Hong ........................ | 423/644 |
| 5,753,054 | A | * | 5/1998 | Tsuji et al. ................ | 148/442 |
| 5,968,291 | A | * | 10/1999 | Iba et al. ................... | 148/421 |
| 6,153,032 | A | * | 11/2000 | Iba et al. ................... | 148/669 |
| 6,270,719 | B1 | * | 8/2001 | Fetcenko et al. .......... | 420/588 |
| 6,274,194 | B1 | * | 8/2001 | Mori et al. ................ | 427/216 |
| 6,616,891 | B1 | * | 9/2003 | Sapru et al. ............... | 420/421 |
| 2002/0189723 | A1 | * | 12/2002 | Okada et al. .............. | 148/538 |
| 2004/0011444 | A1 | * | 1/2004 | Okada et al. .............. | 148/712 |
| 2004/0037733 | A1 | * | 2/2004 | Oka ........................... | 420/428 |
| 2005/0051244 | A1 | * | 3/2005 | Fetcenko et al. .......... | 148/442 |
| 2005/0067060 | A1 | * | 3/2005 | Huang et al. .............. | 148/421 |
| 2005/0079090 | A1 | * | 4/2005 | Okada et al. .............. | 420/428 |
| 2005/0135961 | A1 | * | 6/2005 | Young et al. .............. | 420/424 |
| 2006/0032561 | A1 | * | 2/2006 | Young et al. .............. | 148/668 |

FOREIGN PATENT DOCUMENTS

JP         09-283157         4/1999

* cited by examiner

*Primary Examiner*—Roy King
*Assistant Examiner*—Christopher Kessler
(74) *Attorney, Agent, or Firm*—David W. Schumaker

(57) ABSTRACT

A BCC phase hydrogen storage alloy capable of storing approximately 4.0 wt. % hydrogen and delivering reversibly up to 3.0 wt. % hydrogen at temperatures up to 110° C. The hydrogen storage alloys also possess excellent kinetics whereby up to 80% of the hydrogen storage capacity of the hydrogen storage alloy may be reached in 30 seconds and 80% of the total hydrogen storage capacity may be desorbed from the hydrogen storage alloy in 90 seconds. The hydrogen storage alloys also have excellent stability which provides for long cycle life.

17 Claims, 13 Drawing Sheets

HYDROGEN STORAGE MATERIALS HAVING EXCELLENT KINETICS, CAPACITY, AND CYCLE STABILITY

FIELD OF THE INVENTION

The present invention relates to hydrogen storage alloys utilized for the reversible storage of hydrogen. More particularly, the present invention relates to hydrogen storage alloys having excellent absorption and desorption kinetics.

BACKGROUND

Hydrogen storage is a technology critical to a wide variety of applications, some of the most prevalent being fuel cells, portable power generation, and hydrogen combustion engines. Such applications would benefit substantially from hydrogen storage alloys capable of absorbing and desorbing higher amounts of hydrogen as compared to present day commercially available hydrogen storage alloys. Hydrogen storage alloys having the hydrogen absorption and desorption characteristics of the present invention will benefit such applications by providing longer operating life and/or range on a single charge for hydrogen power generators, fuel cells, and hydrogen internal combustion engines.

In the past considerable attention has been given to the use of hydrogen as a fuel or fuel supplement. While the world's oil reserves are being rapidly depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable lightweight hydrogen storage medium. Conventionally, hydrogen has been stored in a pressure-resistant vessel under a high pressure or stored as a cryogenic liquid, being cooled to an extremely low temperature. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas weighs about thirty times the weight of a container of gasoline. Additionally, transfer is very difficult, since the hydrogen is stored in a large-sized vessel. Furthermore, storage as a liquid presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high storage capacity relative to the weight of the material, a suitable desorption temperature/pressure, good kinetics, good reversibility, resistance to poisoning by contaminants including those present in the hydrogen gas, and be of a relatively low cost. If the material fails to possess any one of these characteristics it will not be acceptable for wide scale commercial utilization.

The hydrogen storage capacity per unit weight of material is an important consideration in many applications, particularly where the hydride does not remain stationary. A low hydrogen storage capacity relative to the weight of the material reduces the mileage and hence the range of a hydrogen fueled vehicle making the use of such materials. A low desorption temperature is desirable to reduce the amount of energy required to release the hydrogen. Furthermore, a relatively low desorption temperature to release the stored hydrogen is necessary for efficient utilization of the available exhaust heat from vehicles, machinery, fuel cells, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

The prior art hydrogen storage materials include a variety of metallic materials for hydrogen-storage, e.g., Mg, Mg—Ni, Mg—Cu, Ti—Fe, Ti—Mn, Ti—Ni, Mm-Ni and Mm-Co alloy systems (wherein, Mm is Misch metal, which is a rare-earth metal or combination/alloy of rare-earth metals). None of these prior art materials, however, has had all of the properties required for a storage medium with widespread commercial utilization.

Of these materials, the Mg alloy systems can store relatively large amounts of hydrogen per unit weight of the storage material. However, heat energy must be supplied to release the hydrogen stored in the alloy, because of its low hydrogen dissociation equilibrium pressure at room temperature. Moreover, release of hydrogen can be made, only at a high temperature of over 250° C. along with the consumption of large amounts of energy.

The rare-earth (Misch metal) alloys have their own problems. Although they typically can efficiently absorb and release hydrogen at room temperature, based on the fact that it has a hydrogen dissociation equilibrium pressure on the order of several atmospheres at room temperature, their hydrogen-storage capacity per unit weight is only about 1.2 weight percent.

The Ti—Fe alloy system which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres for initial hydrogenation, the alloy system provides relatively low hydrogen absorption/desorption rate. Also, it has a hysteresis problem which hinders the complete release of hydrogen stored therein.

Hydrogen storage alloys have various crystal structures which play an important role in the alloys ability to absorb and desorb hydrogen. Some of the crystal structures include body centered cubic (BCC), face centered cubic (FCC), or C-14 Laves phase. Hydrogen storage alloys may also change crystal structure upon absorption/desorption of hydrogen. The crystal structure of the BCC phase hydrogen storage alloys, upon absorption of hydrogen, may change to an FCC crystal structure. When this change in crystal structure occurs, excess energy (heat) may be needed to desorb the hydrogen stored within the alloy. Reduced cycling may also be realized due to degradation of the alloy resulting from changes in the crystal structure. Another disadvantage of the change in crystal structure is that the structure does not completely revert back to a BCC crystal structure upon desorption of hydrogen. Upon desorption of hydrogen, the alloy has a combination BCC/FCC crystal structure. This adversely affects the hydrogen storage properties of the alloy, because all the benefits of having a BCC alloy will not be realized. Although the original BCC crystal structure may be restored by heating the alloy, this is not practical for most systems utilizing BCC alloys due to their low temperature design.

BCC alloys are widely used for the storage of hydrogen and have been the subject of multiple patents. Iba et al. (U.S. Pat. No. 5,968,291) discloses Ti—V based BCC phase hydrogen storage alloys comprising two solid solutions having a periodical structure formed by spinodal decomposition. While the alloys disclosed in Iba et al. are able to achieve hydrogen storage capacities of approximately 3.5 weight percent hydrogen, they are only able to achieve approximately 2.0 weight percent reversible hydrogen storage, which makes them unsuitable for many applications. For example, in vehicle applications, alloys having a low reversible hydrogen storage capacity adversely affect the range of the vehicle or require additional weight and space considerations for onboard metal hydride storage to obtain minimum range requirements. Such is the case with portable power applications as well.

Sapru et al. (U.S. Pat. No. 6,616,891) discloses BCC phase hydrogen storage alloys capable of absorbing up to 4.0 weight percent hydrogen while capable of desorbing up to 2.8 weight percent hydrogen. However, Sapru et al. is only able to obtain these hydrogen storage characteristics at temperatures of 150° C. The alloys disclosed by Sapru et al. are Ti—V based with the addition of various modifier elements which improve the reversibility of the hydrogen storage alloys. While the alloys disclosed in Sapru et al. have demonstrated excellent hydrogen absorption/desorption properties at temperatures up to 150° C., there is still a need to provide such properties at lower temperatures. The ability to operate at lower temperatures will provide many additional opportunities for hydrogen to be the fuel of choice for a wide variety of applications.

Another problem with prior art BCC alloys is that while they may initially have a good hydrogen storage capacity, these alloys have very poor stability. Upon increased cycling, the poor stability of the BCC hydrogen storage alloys causes a significant reduction in the hydrogen storage capacity of the alloys, which has resulted in BCC alloys being overlooked for a wide variety of hydrogen storage applications.

Under the circumstances, a variety of approaches have been made to solve the problems of the prior art and to develop an improved material which has a high hydrogen storage efficiency with excellent reversibility, a proper hydrogen dissociation equilibrium pressure, a high absorption/desorption rate, and excellent phase stability resulting in increased cycle life.

SUMMARY OF THE INVENTION

The present invention discloses a hydrogen storage alloy which absorbs at least 80% of its hydrogen storage capacity within 180 seconds, desorbs at least 80% of its total hydrogen storage capacity within 180 seconds, and reversibly stores at least 2.2 weight percent hydrogen at temperatures up to 110° C. The hydrogen storage alloy may also absorb at least 80% of its hydrogen storage capacity within 30 seconds and desorb at least 80% of its total hydrogen storage capacity within 90 seconds at temperatures up to 110° C. At least 85% of the hydrogen storage alloy reverts to a BCC or BCT crystal structure from a FCC crystal structure upon desorption of hydrogen from the hydrogen storage alloy.

The lattice constant of the hydrogen storage alloy is in the range of 3.015 to 3.045 angstroms. For high pressure applications, the lattice constant of the hydrogen storage alloy is preferably in the range of 3.015 to 3.028 angstroms. For low pressure applications, the lattice constant of said hydrogen storage alloy is in the range of 3.028 to 3.045 angstroms. The surface of said hydrogen storage alloy may be substantially free of any oxides. The hydrogen storage alloy may have a cycle life greater than 700 cycles. The hydrogen storage alloy reversibly stores up to 2.83 weight percent hydrogen at 90° C., and up to 3.01 weight percent hydrogen at 110° C.

The hydrogen storage alloy comprises 8.0 to 45 atomic percent titanium, 5.0 to 75 atomic percent vanadium, and 10 to 65 atomic percent chromium. The hydrogen storage alloy may further comprises one or more modifier elements selected from nickel, manganese, molybdenum, aluminum, iron, silicon, magnesium, ruthenium, or cobalt, wherein the modifier elements are present in an amount greater than 0 up to 16 atomic percent. The hydrogen storage alloy may have a single phase BCC structure, which may be formed by cooling at a quench rate in the range of $10^2$ to $10^{3\circ}$ C./second.

The present invention also disclosed a process for producing a hydrogen storage alloy, said process comprising 1) forming a hydrogen storage alloy having two or more elements, 2) annealing the hydrogen storage alloy to form a substantially single phase BCC structure, 3) quenching the annealed hydrogen-storage alloy at a cooling rate in the range of $10^2$ to $10^{3\circ}$ C./second, and 4) inhibiting the formation of the oxides on the surface of the hydrogen storage alloy during quenching and/or removing said oxides from the surface of the hydrogen storage alloy after quenching.

The hydrogen storage alloy may be formed via arc melting, cold wall induction melting, or levitation melting techniques. The hydrogen storage alloy may be annealed at a temperature in the range of 1350° C. to 1450° C. and quenched in liquid argon, liquid nitrogen, or water. The oxides on the surface of the hydrogen storage alloy may be removed via etching or mechanical grinding.

DETAILED DESCRIPTION OF THE INVENTION

Figure 1:
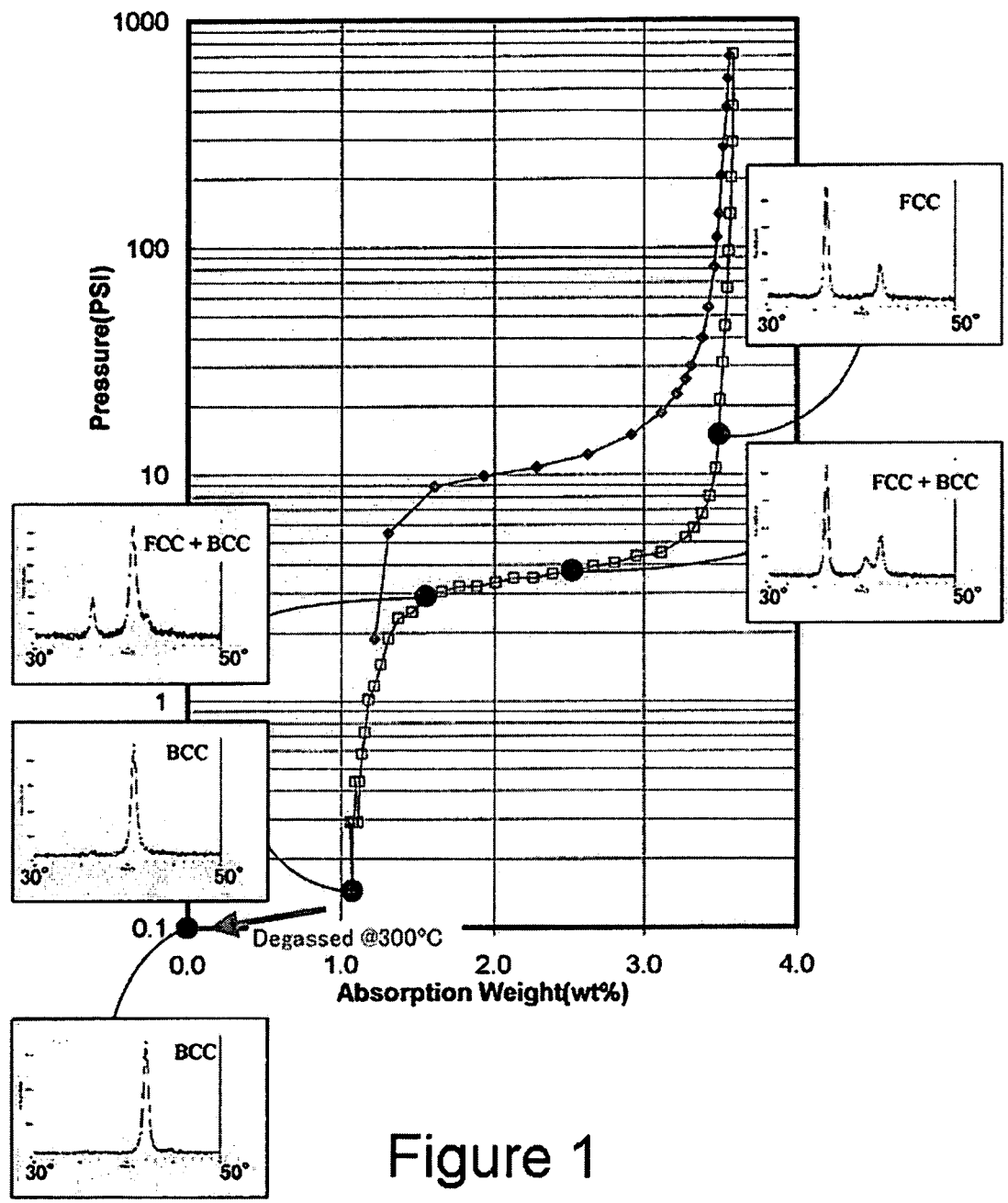
FIG. 1, is a PCT plot of a medium vanadium content alloy accordance with the present invention showing the change in crystal structure as hydrogen is absorbed and desorbed from the alloy.

The present invention discloses hydrogen storage alloys generally having a single phase body centered cubic (BCC) structure, although more than one BCC phase may be present. These alloys are capable of storing approximately 4.0 wt. % hydrogen and delivering reversibly up to 3.0 wt. % hydrogen at temperatures ranging from 90° C. to 110° C. The hydrogen storage alloys also possess excellent kinetics whereby up to 80% of the hydrogen storage capacity of the hydrogen storage alloy may be reached in 30 seconds and 80% of the total hydrogen storage capacity may be desorbed from the hydrogen storage alloy in 90 seconds. The hydrogen storage alloys also have excellent stability which provides for long cycle life.

The hydrogen storage alloys may be generally composed of titanium, vanadium, and chromium. The alloys generally include 8.0 to 45 atomic percent titanium, 5.0 to 75 atomic percent vanadium, and 10 to 65 atomic percent chromium. The hydrogen storage alloys are classified as 1) high vanadium content, 2) low vanadium content, or 2) medium vanadium content. The high vanadium content alloys exhibit a BCC structure after melting and cooling. This family of alloys, however, has the lowest reversible capacity as compared to low vanadium, content and medium vanadium content alloys. The low vanadium content alloys normally have a stable Laves phase when cooling to room temperature after melting without the addition of modifier elements. The BCC crystal structure of these alloys only exists at a narrow temperature window above 1370° C. Therefore an annealing/quenching process may be used to obtain the BCC form of this material. Although by adding a proper amount of modifier elements with a controlled melting method a clean BCC structure may be obtained directly from melting, a post annealing/quench is still recommended. The low vanadium content alloys have a much better cycle life as compared to the high vanadium and medium vanadium content alloys. The medium vanadium content alloys have a much better reversible storage capacity as compared to the high vanadium content and low vanadium content alloys. As with the low vanadium content alloys, the medium content alloys are preferably annealed and quenched after melting to obtain a BCC structure. However, such steps may be omitted by inclusion of certain modifier elements with a controlled melting method.

The hydrogen storage alloys of the present invention may include one or more modifier elements selected from nickel, manganese, molybdenum, aluminum, iron, silicon, magnesium, ruthenium, and cobalt. Such elements may be included in the hydrogen storage alloy in the range of 0-16 atomic percent. Some of the modifier elements may also be available as impurities in vanadium. Vanadium containing such impurities is cheaper in cost and can result in cost savings when producing such alloys. Preferred alloys of the present invention are shown by atomic percent in Table 1.

TABLE 1

| Alloy Sample | V | Ti | Cr | Ni | Mn | Mo | Al | Fe | Si | Mg | Ru | Co |
|---|---|---|---|---|---|---|---|---|---|---|---|---|
| 1 | 80.00 | 10.00 | | 10.00 | | | | | | | | |
| 2 | 75.00 | 10.00 | | 15.00 | | | | | | | | |
| 3 | 75.00 | 10.00 | 5.00 | 10.00 | | | | | | | | |
| 4 | 75.00 | 10.00 | | 10.00 | 5.00 | | | | | | | |
| 5 | 5.00 | 33.00 | 62.00 | | | | | | | | | |
| 6 | 7.50 | 33.00 | 59.50 | | | | | | | | | |
| 7 | | 33.00 | 64.50 | | | 2.50 | | | | | | |
| 8 | | 33.00 | 62.00 | | | 5.00 | | | | | | |
| 9 | 2.50 | 33.00 | 59.50 | | | 2.50 | 2.50 | | | | | |
| 10 | 26.01 | 32.76 | 25.85 | | 14.77 | 0.59 | | | | | | |
| 11 | | 40.00 | 58.00 | | | 2.00 | | | | | | |
| 12 | | 40.00 | 56.00 | | | 4.00 | | | | | | |
| 13 | | 40.00 | 50.00 | | | 10.00 | | | | | | |

TABLE 1-continued

| Alloy Sample | V | Ti | Cr | Ni | Mn | Mo | Al | Fe | Si | Mg | Ru | Co |
|---|---|---|---|---|---|---|---|---|---|---|---|---|
| 14 | 2.00 | 40.00 | 58.00 | | | | | | | | | |
| 15 | 4.00 | 40.00 | 56.00 | | | | | | | | | |
| 16 | 10.00 | 40.00 | 50.00 | | | | | | | | | |
| 17 | 6.00 | 43.00 | 51.00 | | | | | | | | | |
| 18 | 5.00 | 58.00 | 37.00 | | | | | | | | | |
| 19 | 80.00 | 10.00 | 10.00 | | | | | | | | | |
| 20 | 23.00 | 28.00 | 42.00 | | 4.00 | 1.00 | | 2.00 | | | | |
| 21 | 74.50 | 10.00 | 12.50 | | 3.00 | | | | | | | |
| 22 | 75.50 | 10.00 | 11.00 | 1.50 | 2.00 | | | | | | | |
| 23 | 46.88 | 52.88 | | 0.12 | | | 0.084 | | | | | |
| 24 | 23.00 | 30.00 | 42.00 | | 2.00 | 1.00 | | 2.00 | | | | |
| 25 | 23.00 | 32.00 | 38.50 | | 5.00 | 0.50 | | 1.00 | | | | |
| 26 | 62.50 | | | | | | | | 37.50 | | | |
| 27 | 77.00 | 8.00 | 12.00 | 0.50 | 2.50 | | | | | | | |
| 28 | 23.00 | 30.00 | 42.00 | | 3.00 | | | 2.00 | | | | |
| 29 | 20.00 | 33.33 | 46.67 | | | | | | | | | |
| 30 | 46.67 | 33.33 | 20.00 | | | | | | | | | |
| 31 | 33.00 | 47.00 | 20.00 | | | | | | | | | |
| 32 | 40.00 | 40.00 | 20.00 | | | | | | | | | |
| 33 | 26.00 | 33.00 | 26.00 | | 15.00 | | | | | | | |
| 34 | 26.00 | 31.00 | 28.00 | | 15.00 | | | | | | | |
| 35 | 26.00 | 28.00 | 31.00 | | 15.00 | | | | | | | |
| 36 | 10.13 | 40.35 | 48.46 | | | 1.05 | | | | | | |
| 37 | | 40.00 | 45.00 | | | 15.00 | | | | | | |
| 38 | 8.00 | 40.00 | 52.00 | | | | | | | | | |
| 39 | 5.00 | 40.00 | 50.00 | | | 5.00 | | | | | | |
| 40 | | 40.00 | 49.00 | 1.00 | | 10.00 | | | | | | |
| 41 | 10.00 | 40.00 | 49.00 | 1.00 | | | | | | | | |
| 42 | | 50.00 | | | | | | | | 50.00 | | |
| 43 | 33.30 | | | | 33.30 | | | | | 33.30 | | |
| 44 | | 40.00 | 48.00 | | | 10.00 | | | | | 2.00 | |
| 45 | 10.00 | 40.00 | 48.00 | | | | | | | | 2.00 | |
| 46 | 74.50 | 10.00 | 11.50 | | 4.00 | | | | | | | |
| 47 | 74.00 | 10.00 | 11.00 | | 5.00 | | | | | | | |
| 48 | 74.00 | 10.00 | 10.00 | | 6.00 | | | | | | | |
| 49 | 9.00 | 40.00 | 50.00 | 1.00 | | | | | | | | |
| 50 | 9.00 | 40.00 | 50.00 | | | 1.00 | | | | | | |
| 51 | 9.00 | 40.00 | 50.00 | | | | | 1.00 | | | | |
| 52 | 8.50 | 40.00 | 50.00 | 0.50 | | | 0.50 | 0.50 | | | | |
| 53 | 67.50 | 10.00 | 12.50 | 7.00 | 3.00 | | | | | | | |
| 54 | 67.50 | 10.00 | 12.50 | | 3.00 | 7.00 | | | | | | |
| 55 | 67.50 | 10.00 | 12.50 | | 3.00 | | | 7.00 | | | | |
| 56 | 65.50 | 10.00 | 12.50 | 3.00 | 3.00 | | 3.00 | 3.00 | | | | |
| 57 | 23.00 | 30.00 | 40.00 | 2.00 | 3.00 | | | 2.00 | | | | |
| 58 | 23.00 | 30.00 | 40.00 | | 3.00 | 2.00 | | 2.00 | | | | |
| 59 | 23.00 | 30.00 | 38.00 | 2.00 | 3.00 | | 2.00 | 2.00 | | | | |
| 60 | 23.00 | 30.00 | 41.00 | | 3.00 | | | 3.00 | | | | |
| 61 | 23.00 | 30.00 | 40.00 | | 3.00 | | | 4.00 | | | | |
| 62 | 23 | 30 | 42 | | | | | 5 | | | | |
| 63 | 23 | 30 | 40 | | 4 | | | 3 | | | | |
| 64 | 23 | 30 | 39 | | 4 | | | 4 | | | | |
| 65 | 23 | 30 | 39 | | 5 | | | 3 | | | | |
| 66 | 23 | 30 | 39 | | 3 | | | 5 | | | | |
| 67 | 23 | 30 | 42 | | 2 | | | 3 | | | | |
| 68 | 50 | 21 | 29 | | | | | | | | | |
| 69 | 30 | 31 | 39 | | | | | | | | | |
| 70 | 9 | 40 | 50 | | | | | | | | | 1 |
| 71 | 8 | 40 | 50 | 0.5 | | | 0.5 | 0.5 | | | | 0.5 |
| 72 | 67.5 | 10 | 12.5 | | 3 | | | | | | | 7 |
| 73 | 66.5 | 10 | 12.5 | 2 | 3 | | 2 | 2 | | | | 2 |
| 74 | 23 | 30 | 40 | | 3 | | | 2 | | | | 2 |
| 75 | 23 | 30 | 38 | 1.5 | 3 | | 1.5 | 1.5 | | | | 1.5 |

During absorption/desorption cycling of the alloys of the present invention, the crystal structure of the alloys changes between BCC phase and FCC phase. Shown in FIG. 1, is a PCT plot of a medium vanadium content alloy 10 ($V_{26}Ti_{32.7}Cr_{25.9}Mn_{14.8}Mo_{0.6}$) in accordance with the present invention showing the change in crystal structure as hydrogen is absorbed and desorbed from the alloy. In typical BCC phase hydrogen storage alloys the BCC crystal structure is transformed into a FCC crystal structure upon absorption of hydrogen and the FCC crystal structure converts into a BCC plus FCC crystal structure after desorption of the stored hydrogen. While the FCC phase allows for high hydrogen storage, the stored hydrogen is not able to be released at useful temperatures, therefore the reversibility of the alloys is adversely affected resulting in a decrease in cycling. It is possible, however, to convert the crystal structure from BCC plus FCC back to BCC by heating the alloy above 300° C., but this is not practical for most low temperature applications.

The alloys of the present invention are able to cycle back and forth between the original body centered cubic (BCC) crystal structure (sometimes combined with a body centered tetragonal (BCT) crystal structure) and the face centered cubic (FCC) crystal structure while leaving substantially no remnants of the FCC structure when the stored hydrogen has been desorbed from the alloy. Upon desorption of hydrogen, the hydrogen storage alloys of the present invention are able to revert back to the BCC and/or BCT phase while leaving less than 15% of the alloy in the FCC phase. Preferably, the hydrogen storage alloys of the present invention are able to revert back to the BCC and/or BCT phase while leaving less than 10% of the alloy in the FCC phase. Most preferably, the hydrogen storage alloys of the present invention are able to revert back to the BCC and/or BCT phase while leaving less than 5% of the alloy in the FCC phase.

Figure 2:
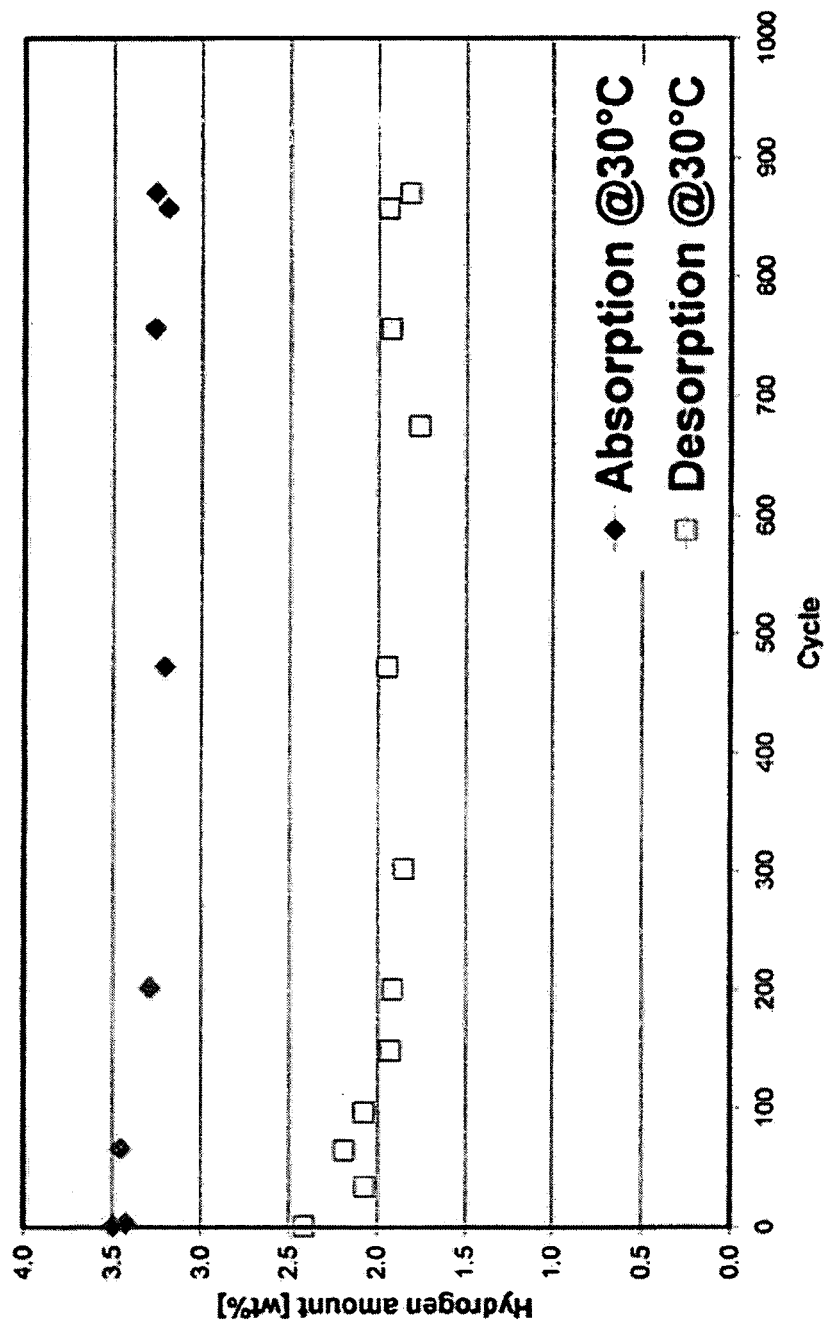
FIG. 2 shows the cycle stability for low vanadium content alloy in accordance with the present invention.
Figure 3:
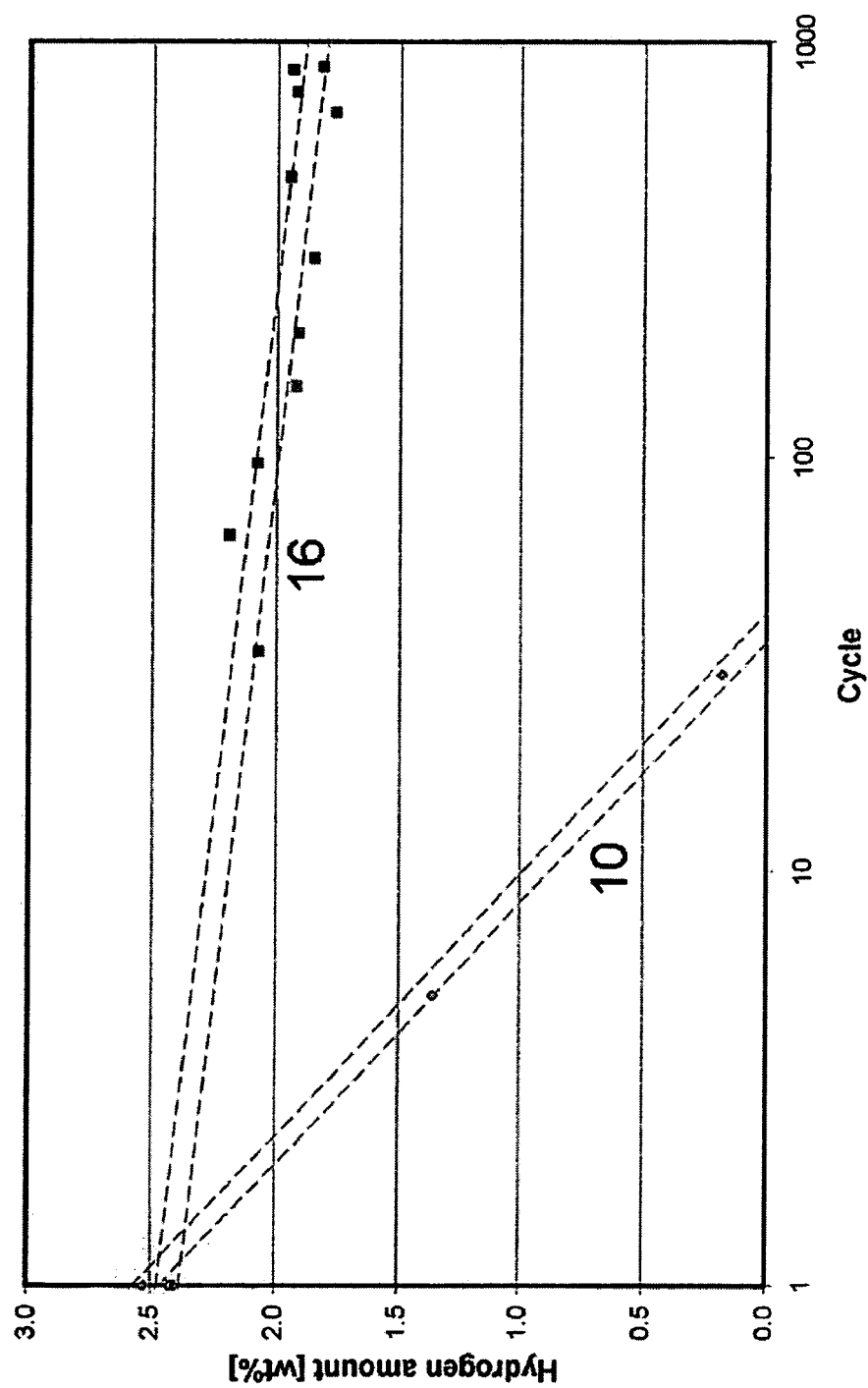
FIG. 3, is a plot comparing the cycle stabilities for a medium vanadium content alloy and a low vanadium content alloy in accordance with the present invention.

The ability of the hydrogen storage alloys of the present invention to cycle back and forth between the BCC/BCT and FCC crystal structures allows the alloys of the present invention to achieve increased cycle life. While not wishing to be bound by theory, the present inventors believe that inclusion of the modifier elements through the principles of atomic engineering have resulted in increased cycle life of the alloys by disrupting the transformation of FCC crystal structure to a FCC plus BCC/BCT crystal structure upon desorption of hydrogen from the hydrogen storage alloy. The modifier elements are able to stabilize the BCC/BCT crystal structure by giving the crystal structure a lower energy state. Normally the FCC crystal structure is thermodynamically desirable as opposed to the BCC/BCT crystal structure, but with the inclusion of the modifier elements lowering the energy state of the BCC/BCT crystal structure, the BCC/BCT crystal structure becomes more desirable resulting in the ability for the FCC crystal structure to revert back to the original BCC/BCT crystal structure upon desorption of the stored hydrogen. The ability to revert back to a BCC/BCT phase from the FCC phase allows the hydrogen storage alloys of the present invention to retain their hydrogen storage capacities through extended cycling resulting in excellent cycle life. The alloys of the present invention are able to exhibit cycle stability for 700+ cycles. FIG. 2 shows the cycle stability for low vanadium content alloy 16 ($V_{10}Ti_{40}Cr_{50}$) and FIG. 3 shows the cycle stability for medium vanadium content alloy 10 ($V_{26}Ti_{32.7}Cr_{25.9}Mn_{14.8}Mo_{0.6}$) as compared to the low vanadium content alloy 16 ($V_{10}Ti_{40}Cr_{50}$). After the initial 10% drop in reversible capacity, both the total and reversible capacity remain constant for low vanadium content alloy 16 above 800 cycles. The medium vanadium content alloy 10, however, showed a much degraded cycle performance. It is believed that the degradation in cycle performance can be attributed to the FCC-BCC phase transition becoming less reversible with cycling. The medium vanadium content alloy family, although providing for a higher storage capacity, has a lower cycle life than low vanadium content alloys.

Figure 4:
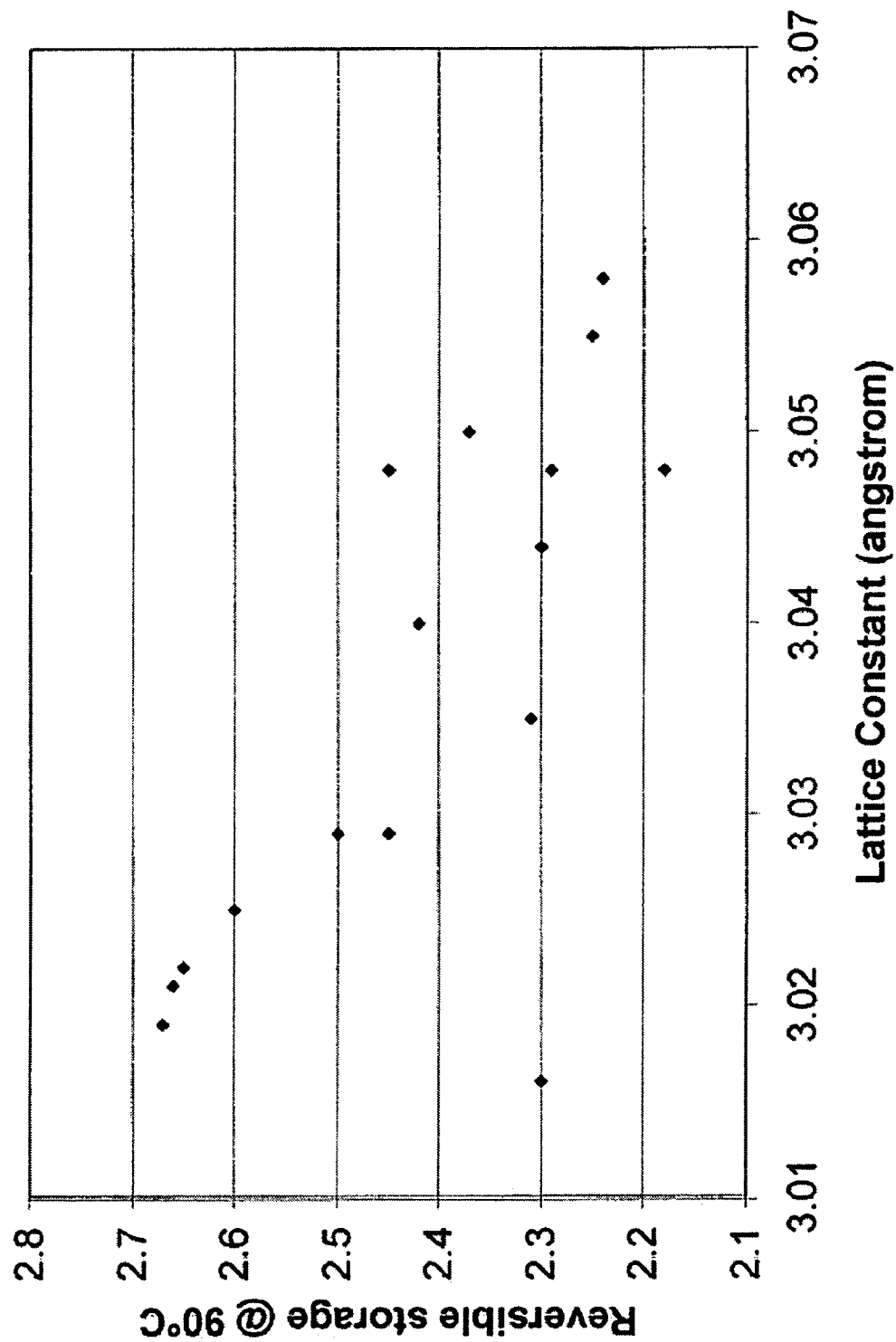
FIG. 4, is a plot showing the relationship between the reversible hydrogen storage capacities at 90° C. and the lattice constant for hydrogen storage alloys in accordance with the present invention.
Figure 5:
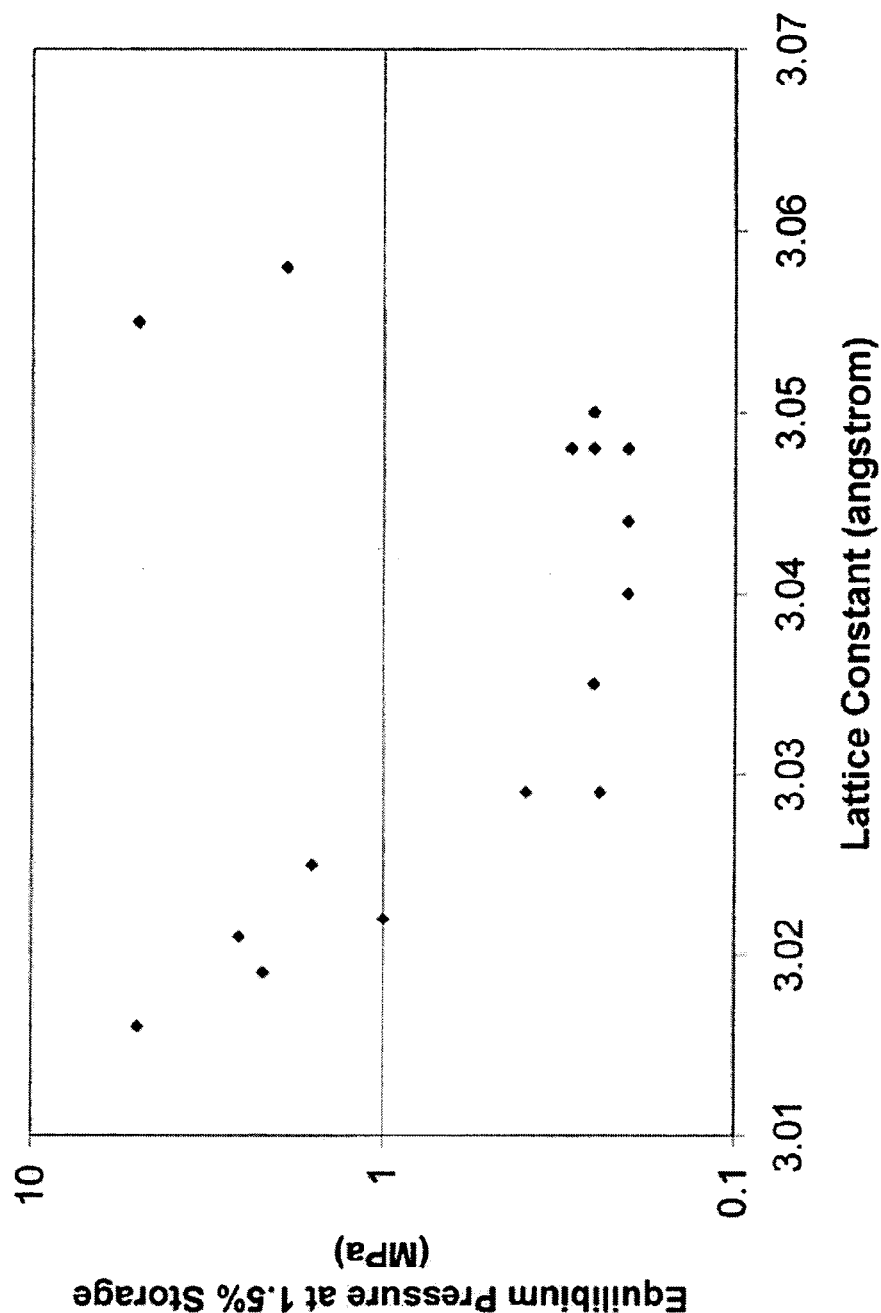
FIG. 5, is a plot showing the relationship between the equilibrium pressure at 1.5% storage and the lattice constant for hydrogen storage alloy in accordance with the present invention.

The lattice constant is another important consideration which directly relates to hydrogen storage characteristics of the hydrogen storage alloys of the present invention. The reversible hydrogen storage capacities at 90° C. for a hydrogen storage alloys in accordance with the present invention are plotted against their respective BCC lattice constants in FIG. 4. As the BCC lattice becomes larger, the hydrogen occupied sites within the alloy become more stable and therefore more reluctant to allow the removal of hydrogen from the bulk of the alloy resulting in a lower reversible capacity. Preferably, the hydrogen storage alloys of the present invention have a lattice constant in the range of 3.015 angstroms to 3.045 angstroms. Hydrogen storage alloys having lattice constants in this range allow for higher hydrogen storage capacity and higher reversibility by providing the hydrogen with greater access to and from bonding sites within the hydrogen storage alloy. Hydrogen storage alloys having a lattice constant outside of this range have an increase in equilibrium pressure. With a smaller lattice constant, hydrogen may not be able to access as many bonding sites within the hydrogen storage alloy resulting in decreased hydrogen storage capacity and reversibility. With a higher lattice constant the quantum tunneling between storage sites becomes too easy and hydrogen is easily removed in the presence of a concentration gradient resulting in decreased hydrogen storage capacity. As shown in FIG. 5, a hydrogen storage alloy having a lattice constant in the range of 3.015 angstroms to 3.028 angstroms is preferred for high pressure applications and a hydrogen storage alloy having a lattice constant in the range of 3.028 angstroms to 3.045 angstroms is preferred for low pressure applications.

The alloys of the present invention may be produced using arc melting, levitation melting, cold wall induction melting, melt spinning, or gas atomization techniques, all of which are well known in the art. Preferably, the alloys of the present invention are produced by arc melting, cold wall induction melting, or levitation melting techniques. With regard to cold wall induction melting and levitation induction melting, cold wall induction melting is able to process more material with less power, while levitation induction melting is able to produce materials with fewer contaminants, such as oxides. Other methods may be used provided they the quench rate required to form the micro-structural or micro-chemical variation within the hydrogen storage alloy giving rise to high hydrogen storage capacity and reversibility.

After the alloys are produced via various melting techniques, the alloys are annealed to increase the packing density of the alloy and remove voids within the alloy structure. By annealing the alloy, the hydrogen storage capacity and reversibility of the hydrogen storage alloys are increased. The hydrogen storage alloys may be annealed for at least 5 minutes at a temperature in the range of 1300° C. to 1500° C., preferably in the range of 1350° C. to 1450° C.

After annealing, to obtain the hydrogen storage characteristics and the fast kinetics earlier described, the hydrogen storage alloys of the present invention are quenched at a rate of $10^2$ to $10^{3}$° C./second to freeze in the desired microstructure. Preferably the alloys are cooled using a low oxygen, quick quench. When quenching the alloys of the present invention, alloys formed with a faster quench rate have been found to exhibit improved hydrogen storage characteristics as compared to alloy formed using a slower quench rate. When utilizing a fast quench rate, the hydrogen storage alloys obtain a substantially uniform single phase BCC crystal structure.

During the melting or quenching of the hydrogen storage alloy an oxide coating may form on the exterior of the alloy particles. While not wishing to be bound by theory, the present inventors believe that the formation of the oxide coating adversely affects the total hydrogen storage capacity of the hydrogen storage alloy while having little or no effect on the reversibility of the alloy. To prevent reduction in the hydrogen storage capacity of the alloy, the oxide coating may be removed from the alloy particles or may be inhibited from forming altogether. To inhibit the oxide coating from forming during melting, the alloy may be melted in a copper crucible instead of various other crucibles, such as aluminum oxide crucibles, which allow oxygen to enter the alloy from the crucible material at high temperatures. Crucibles composed of materials other than copper may also be used provided they do not allow oxygen contained in the crucible material to react with the molten alloy. To inhibit formation of the oxide coating during quenching, the alloy may be quenched in a low oxygen environment. Instead of quenching the alloy in water, the alloy may be quenched in liquid nitrogen, liquid argon, oil, or other media having a low oxygen content. While using these low oxygen content media may prevent or hinder oxide formation on the surface of the alloy particles, the quench rate will be affected due to the differences in heat capacity between the various media, which may be detrimental to the hydrogen storage characteristics of the alloy. When using quenching media allowing the formation of an oxide coating on the surface of the alloy particles, the oxide coating may be removed from the particles via etching or mechanical grinding. These methods may be preferred when a certain quench rate not obtainable with low oxygen content quenching media is desired.

EXAMPLE 1

Figure 6:
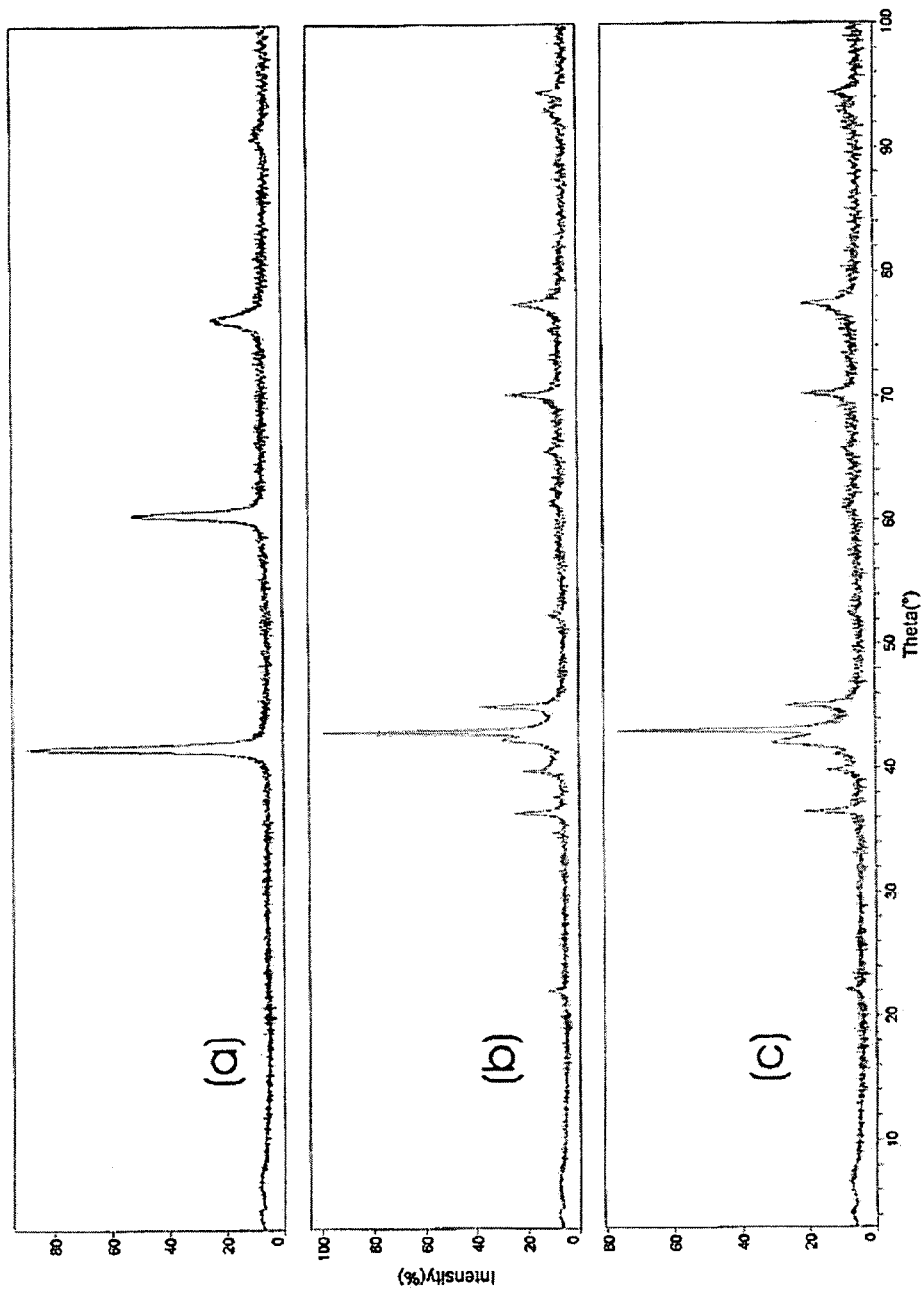
FIG. 6, is a x-ray diffraction analysis of hydrogen storage alloys in accordance with the present invention produced by different melting methods.
Figure 7:
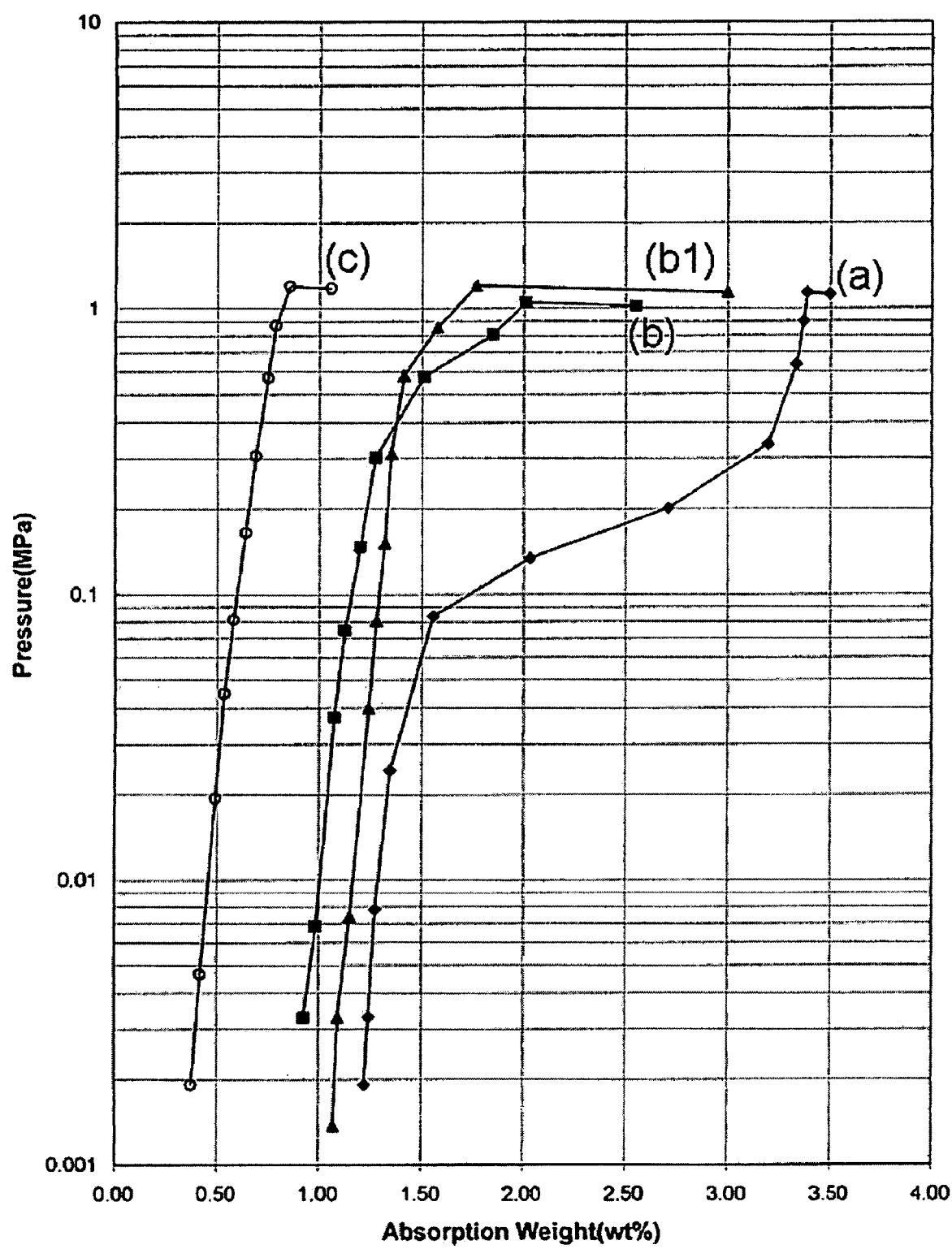
FIG. 7, is a PCT plot of hydrogen storage alloys in accordance with the present invention produced by different melting methods.

To determine the effect of melting techniques on the alloys of the present invention, several 5 g samples of alloy 16 ($V_{10}Ti_{40}Cr_{50}$) in accordance with the present invention were prepared with different melt techniques and subsequently tested for hydrogen storage characteristics. The samples were prepared using arc melting with water cooled copper basin (a), induction furnace with MgO crucible (b), and melt-spinner with boron nitride crucible (c). The samples prepared by arc melting and induction melting were annealed in argon gas for 5 minutes at 1400° C. and quick quenched in water. The melt spin sample was not annealed. For purposes of comparing PCT data, an additional sample (b1) was produced by induction melting in a MgO crucible and annealed for 20 minutes at 1400° C. followed by a quick quench in water. The samples were then etched in 2% HF+10% HCl (50%) solution for 10 minutes in an ultrasonic bath to substantially remove any oxide formed on the surface of the ingots. An X-ray diffraction analysis of the samples is shown in FIG. 6 and a PCT plot is shown in FIG. 7 for the samples. The sample produced via arc melting shows the purest BCC structure while the other samples show secondary phases such and Laves and titanium phases along with the BCC phase. The sample produced via arc melting exhibited the higher total and reversible hydrogen storage capacities. The induction melting sample showed higher plateau pressure and inferior hydrogen storage capacity. The melt spinning sample showed the worst storage capacity among all four samples.

The arc melting sample was prepared using a Discovery 201T arc melter. This system is composed of a water-cooled tungsten anode, a water-cooled copper mold as a cathode, and a vacuum chamber with a mechanical pump. All elements used in the alloy formulation were pure and free of surface contamination. The pre-weighed elements were loaded on top of the water-cooled copper mold in the vacuum chamber of the arc-melter and the arc-melter was evacuated to 20 micron and flushed with argon gas three times to obtain an oxygen free environment. Then for further purification of the arc-melter chamber, a 15 g piece of titanium was melted and cooled three times as an oxygen getter.

The melting temperature controls for the alloying process were based on the element with the highest melting point. The alloying process for the sample was composed of five consecutive twenty second melting and turning over sequences to obtain a homogeneous sample. The alloy sample was cooled in the water cooled copper mold during and after the melting process. After the alloy was prepared, the alloy samples were annealed and quenched.

Figure 8:
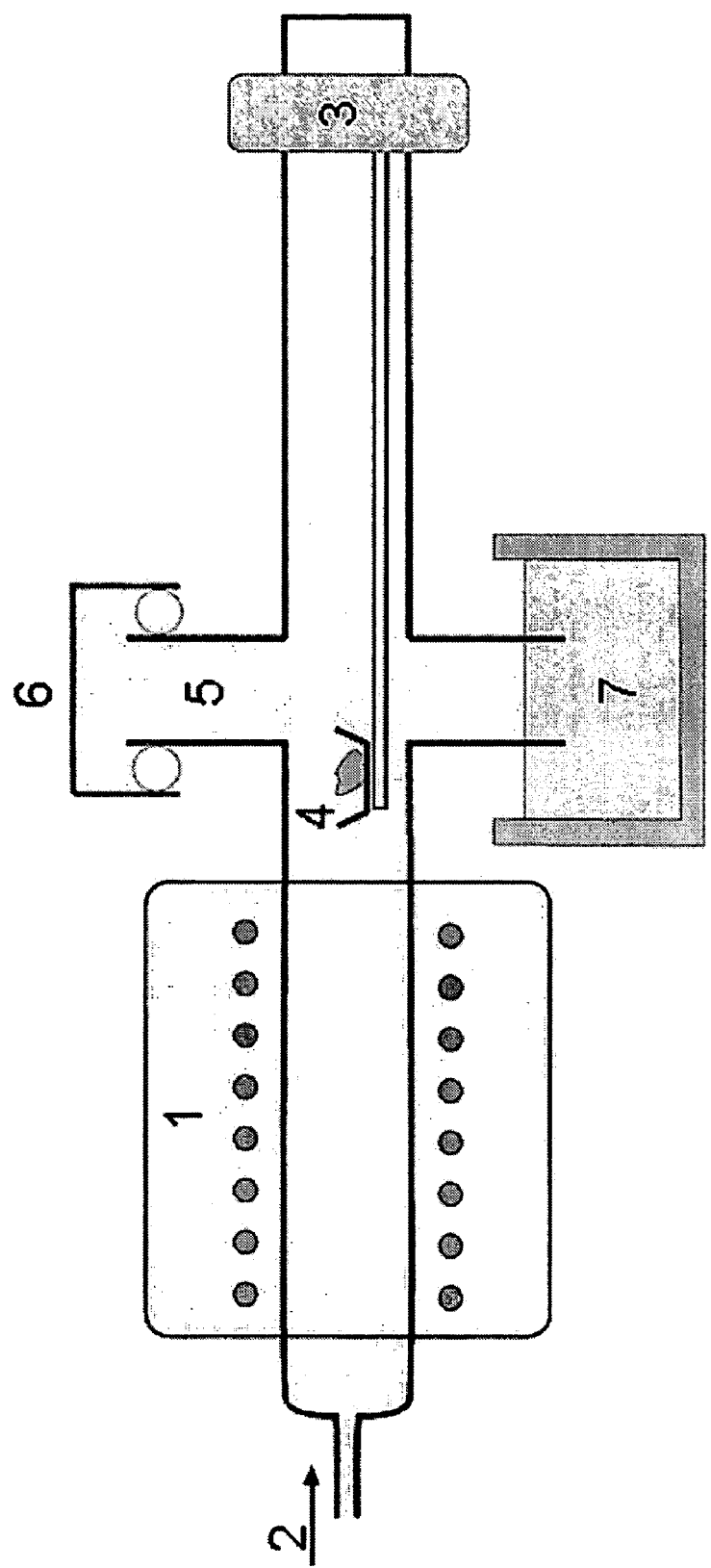
FIG. 8, is a schematic of an apparatus for annealing/quenching the alloys of the present invention.

The apparatus for the annealing/quenching of the alloy is shown in FIG. 8. The apparatus utilizes a type 59300 high temperature tube furnace as the heat zone 1. One horizontal arm of cross quartz tube was inserted through the tube furnace with argon gas 2 continuously flowing therethrough. A magnetically coupled rod 3 was used to move the alloy ingots 4 into and out of the heat zone 1. The alloy ingots 4 were first loaded through the top end 5 of the apparatus through a passage exposed by removing the removable cap 6. The bottom end of the apparatus was immersed into a quenching zone 7 filled with water, liquid argon, liquid nitrogen, or another quenching agent. The alloy ingot 4 was heat-treated at 1673° C. for 5-20 minutes in an argon atmosphere and then quickly removed from the heat zone 1. The boat was then immediately turned over dropping the alloy ingot into the quench zone 7.

EXAMPLE 2

Figure 9:
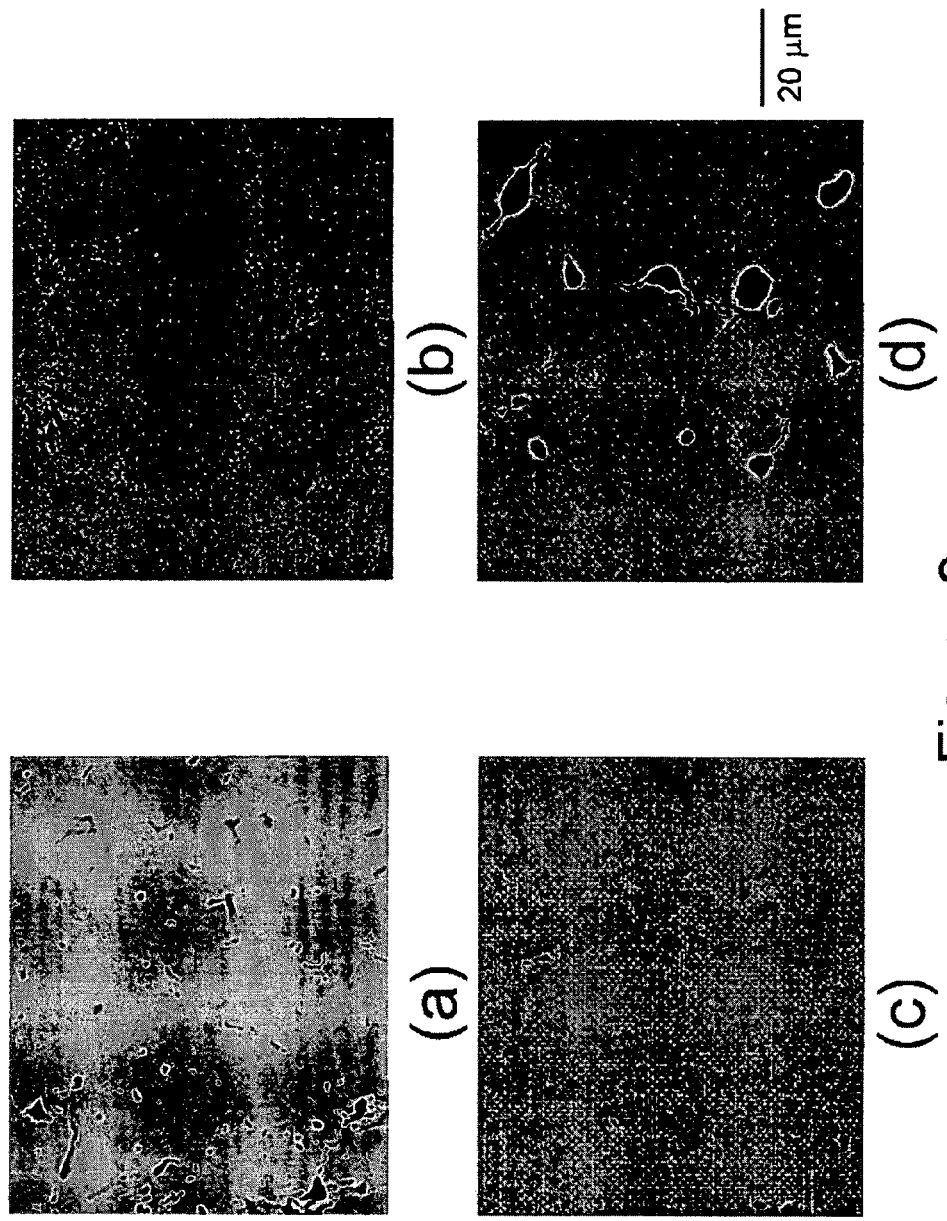
FIG. 9, shows scanning electron micrographs of hydrogen storage alloys in accordance with the present invention produced with different annealing temperatures.

To determine the effect of the annealing temperature on the alloys of the present invention, several samples of alloy 28 ($V_{23}Ti_{30}Cr_{42}Mn_3Fe_2$) were prepared via arc melting (as earlier described). Shown in FIG. 9, are scanning electron micrographs of alloy 28 samples annealed at 1200° C. (a), 1300° C. (b), 1400° C. (c), and 1450° C. (d). Annealing at 1400° C. provides the alloy with a packed microstructure substantially free from voids. Samples annealed at 1200° C. and 1300° C. underwent phase segregation and the sample annealed at 1450° C. showed the formation of secondary phases. The absorption and desorption characteristics of these alloys are summarized below in Table 2.

TABLE 2

| Annealing Temp. | Annealing Time | Absorption at 10° C. | Desorption at 90° C. |
|---|---|---|---|
| 1200° C. | 5 minutes | 3.06% | 2.32% |
| 1300° C. | 5 minutes | 3.36% | 2.56% |
| 1400° C. | 5 minutes | 3.57% | 2.82% |
| 1450° C. | 5 minutes | 3.41% | 2.71% |

EXAMPLE 3

To determine the effect of the annealing duration on the alloys of the present invention, several samples of alloy 28 ($V_{23}Ti_{30}Cr_{42}Mn_3Fe_2$) were prepared via arc melting (as earlier described). Annealing times of 5 minutes, 10 minutes, and 20 minutes were performed on alloy samples at 1400° C. Upon testing, the length of annealing was found to not have as dramatic effect on the hydrogen storage capacity of the hydrogen storage alloy as the annealing temperature. The absorption and desorption characteristics of these alloys are summarized below in Table 3.

TABLE 3

| Annealing Temp | Annealing Time | Absorption at 10° C. | Desorption at 90° C. |
|---|---|---|---|
| 1400° C. | 5 minutes | 3.57% | 2.82% |
| 1400° C. | 10 minutes | 3.50% | 2.78% |
| 1400° C. | 20 minutes | 3.53% | 2.83% |

EXAMPLE 4

To determine the effect of the quenching media on the alloys of the present invention, several samples of alloy 16 ($V_{10}Ti_{40}Cr_{50}$) were prepared via arc melting (as earlier described) and quenched using different quenching media. The alloys were quenched in water, liquid nitrogen, liquid argon, and oil. After quenching, each of the samples were cleaned using a HF/HCl solution. The hydrogen storage measurement results showed no significant difference in the hydrogen absorption and desorption characteristics based on the difference in quenching media, except the oil quenched sample suffered from carbon pick-up as seen from the Auger-Electron spectroscopy depth profile. The absorption and desorption characteristics of these alloys are summarized below in Table 4.

TABLE 4

| Quenching Media | Annealing Condition | Absorption at 10° C. | Desorption at 90° C. |
|---|---|---|---|
| Water | 1400° C. for 5 min | 3.67% | 2.61% |
| Liquid Nitrogen | 1400° C. for 5 min | 3.66% | 2.63% |
| Liquid Argon | 1400° C. for 5 min | 3.67% | 2.62% |
| Oil | 1400° C. for 5 min | 3.59% | 2.55% |

EXAMPLE 5

Figure 10:
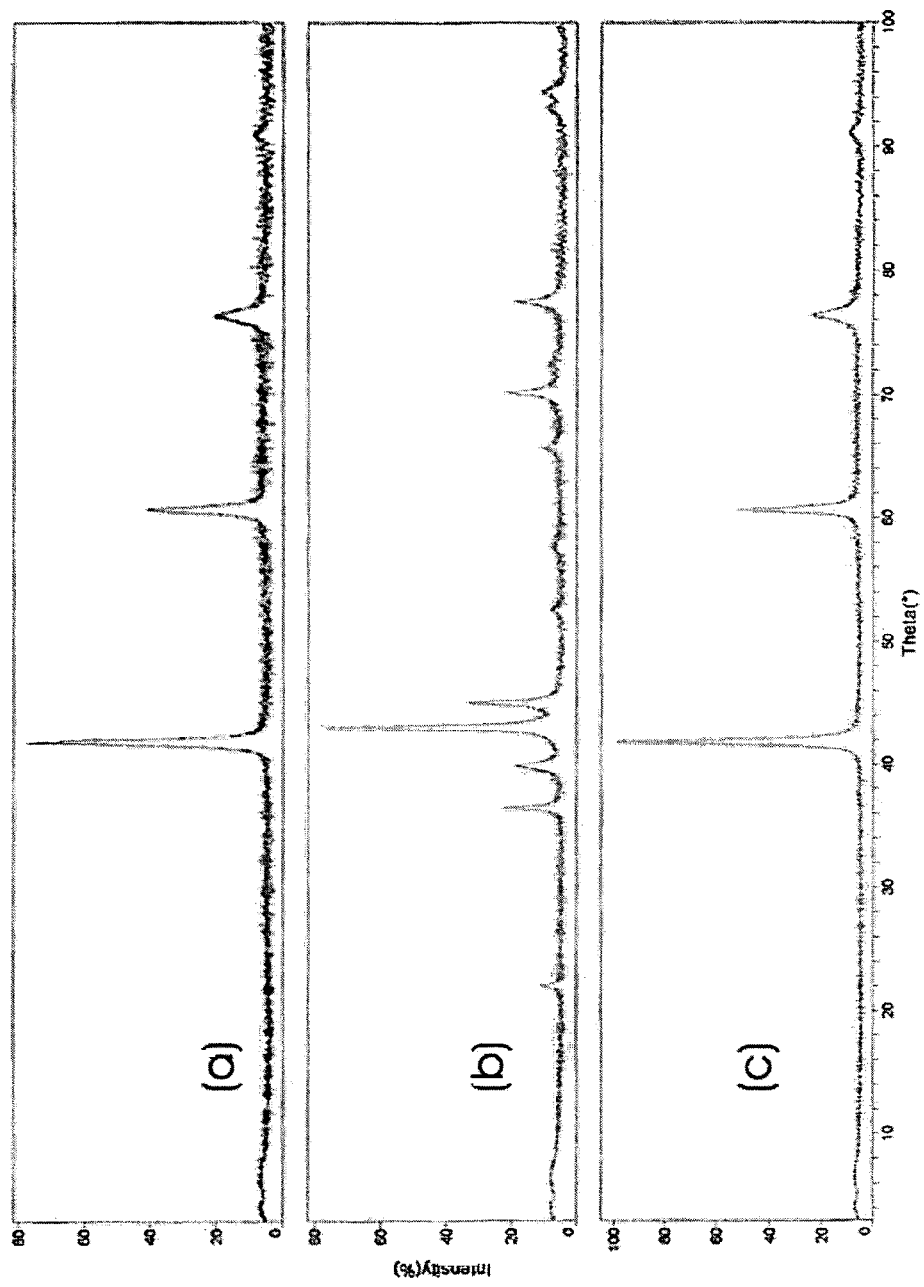
FIG. 10, is a x-ray diffraction analysis of hydrogen storage alloys in accordance with the present invention produced with different post annealing quench rates.
Figure 11:
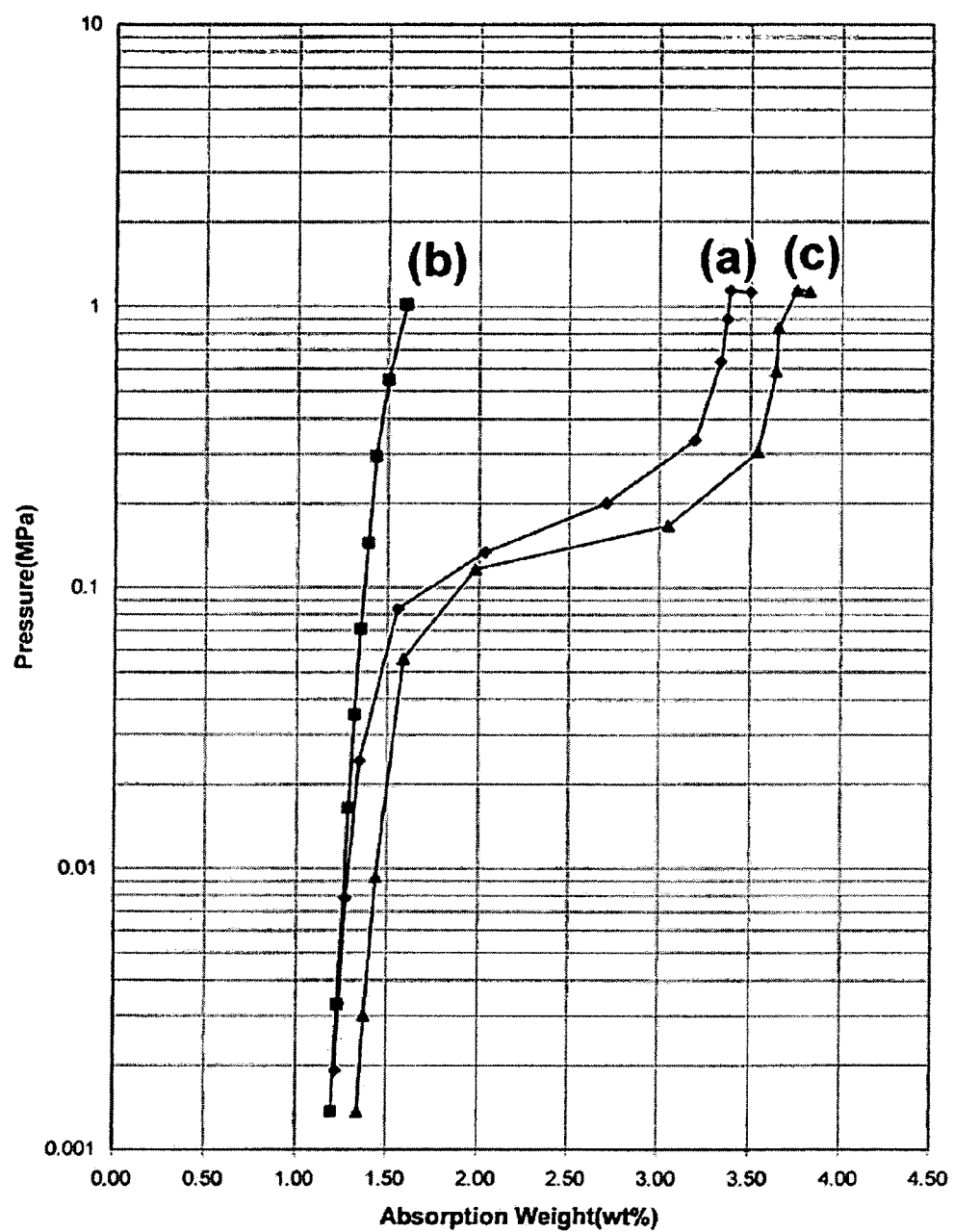
FIG. 11, is a PCT plot of hydrogen storage alloys in accordance with the present invention produced with different post annealing quench rates.

To determine the effect of the quenching speed on the alloys of the present invention, three samples of alloy 16 ($V_{10}Ti_{40}Cr_{50}$) were prepared via arc melting (as earlier described), annealed at 1400° C. for 5 minutes, and cooled at different rates. The three samples included a control (a), a slow cooled sample (b), and a quick quench sample (c). The control sample was a 10 g ingot, which was annealed at 1400° C. for 5 minutes and quenched in water. The quick quenched sample was a 10 g ingot which was ground into several pieces smaller than the control sample to allow faster quenching in water as compared to the control sample. The slow cooled sample was a 10 g ingot that was allowed to cool at room temperature after annealing. The XRD patterns for the three samples are plotted in FIG. 10. Both the control (a) and the quick quench samples (c) showed a pure BCC phase while the slow cool sample exhibited a typical Laves phase structure (b). The quick quenched sample has an identical Lattice constant as the control (3.051 Å), but a larger crystallite size (196 Å vs. 169 Å). PCT isotherms measured for all three samples (a,b,c) are shown in FIG. 11. The quick quench sample exhibited the best hydrogen storage capacity and reversibility of the three samples while the slow cooled sample having a Laves phase exhibited the worst hydrogen storage capacity and reversibility of the three samples.

EXAMPLE 6

To determine the effect of etching the alloys of the present invention, four samples of alloy 16 ($V_{10}Ti_{40}Cr_{50}$) were prepared via arc melting (as earlier described). Sample 1 is an as cast ingot without any post-treatment (annealing or quenching). Sample 2 was annealed at 1400° C. and quenched without any surface cleaning. Sample 3 was annealed at 1400° C. for 5 minutes and water quenched with subsequent mechanical filing to remove the surface oxide from the ingot. Sample 4 was annealed at 1400° C. for 5 minutes, water quenched, with subsequent etch in HF+HCl, which was able to remove more of the surface oxide than the mechanical filing. After preparation, the samples were tested for hydrogen absorption and desorption characteristics. Removal of the surface oxide of the ingots made no significant difference in the reversible storage capacities of the alloys, however, the total hydrogen storage capacity of the alloys improved with more of the surface oxide being removed from the surface of the ingot. The hydrogen storage measurements for the samples are summarized below in Table 5.

TABLE 5

| Process | Absorption at 30° C. | Desorption at 90° C. |
|---|---|---|
| As cast | 3.36% | 2.49% |
| Annealed w/water quench (WQ) | 3.49% | 2.63% |
| Annealed w/WQ and mechanically filed | 3.63% | 2.62% |
| Annealed w/WQ and acid etch | 3.80% | 2.66% |

EXAMPLE 7

To compare the hydrogen storage capacities between the alloys of the present invention based on vanadium content, one alloy from each family (low vanadium, medium vanadium, high vanadium) was selected and tested for hydrogen storage capacity. The samples selected were $V_{10}Ti_{40}Cr_{50}$ (low vanadium content), $V_{80}Ti_{10}Cr_{10}$ (high vanadium content), and $V_{23}Ti_{30}Cr_{41}Mn_3Fe_3$ (medium vanadium content). The samples were prepared via arc melting (as earlier described), annealed at 1400° C. for 5 minutes, water quenched, and acid etched. The samples were first activated in 3 MPa hydrogen with cooling from 300° C. to 30° C., the hydrogen pressure was increased from 3 MPa to 10 MPa, and then cooled down to 10° C. to measure the total hydrogen storage capacity. To desorb the hydrogen, the samples were heated to 90° C. and PCT measurements were performed followed by a second measurement at 110° C. The hydrogen storage capacities for the alloys are shown below in Table 6.

TABLE 6

| Alloy sample | Absorption at 30° C. | Absorption at 10° C. | Desorption at 90° C. | Desorption at 110° C. |
|---|---|---|---|---|
| low vanadium | 3.66% | 3.69% | 2.63% | 2.71% |
| high vanadium | 3.65% | 3.68% | 2.45% | |
| medium vanadium | 3.49% | 3.57% | 2.84% | 3.01% |

EXAMPLE 8

Figure 12:
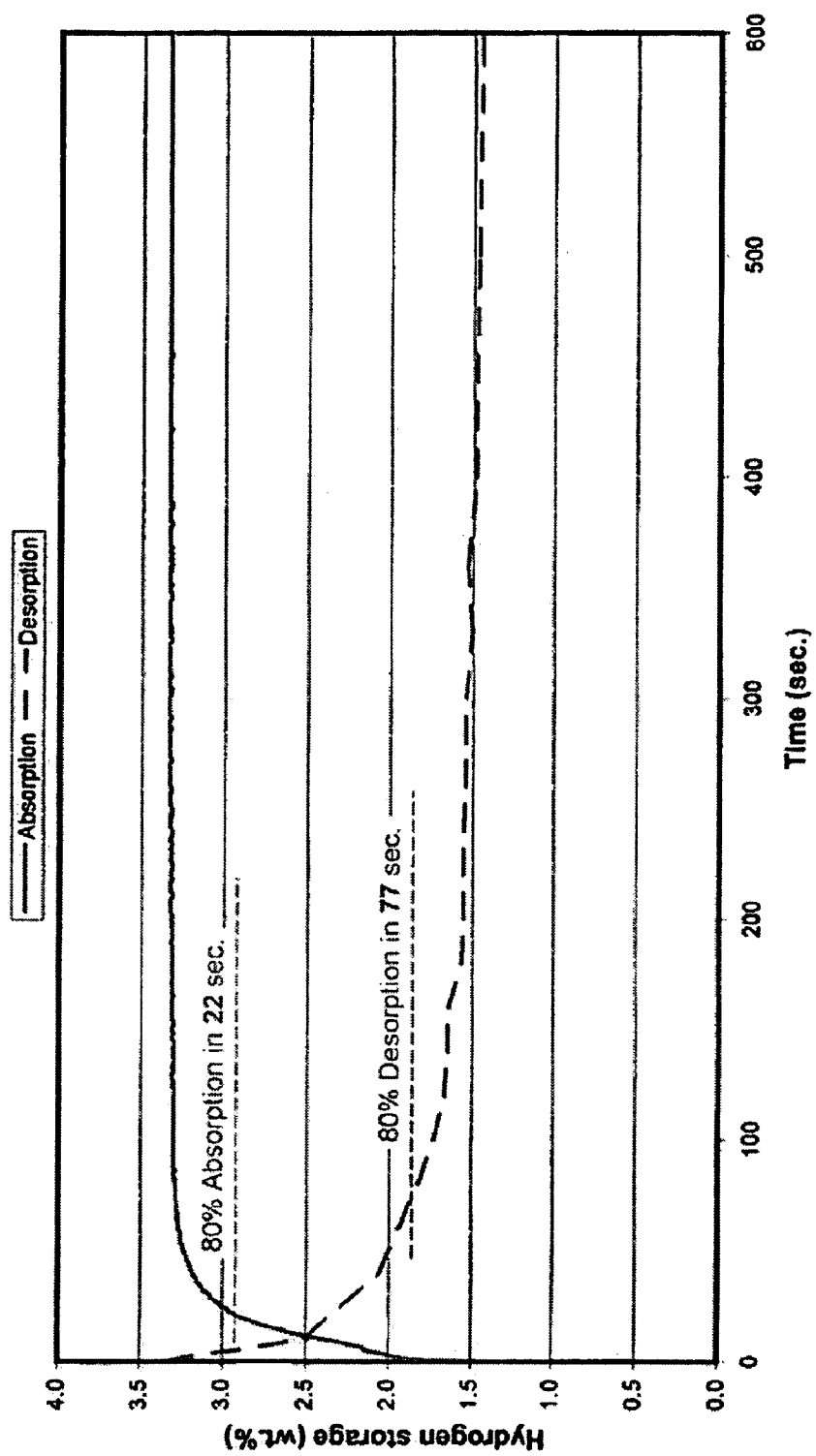
FIG. 12, shows the absorption/desorption rate for a low vanadium alloy in accordance with the present invention.
Figure 13:
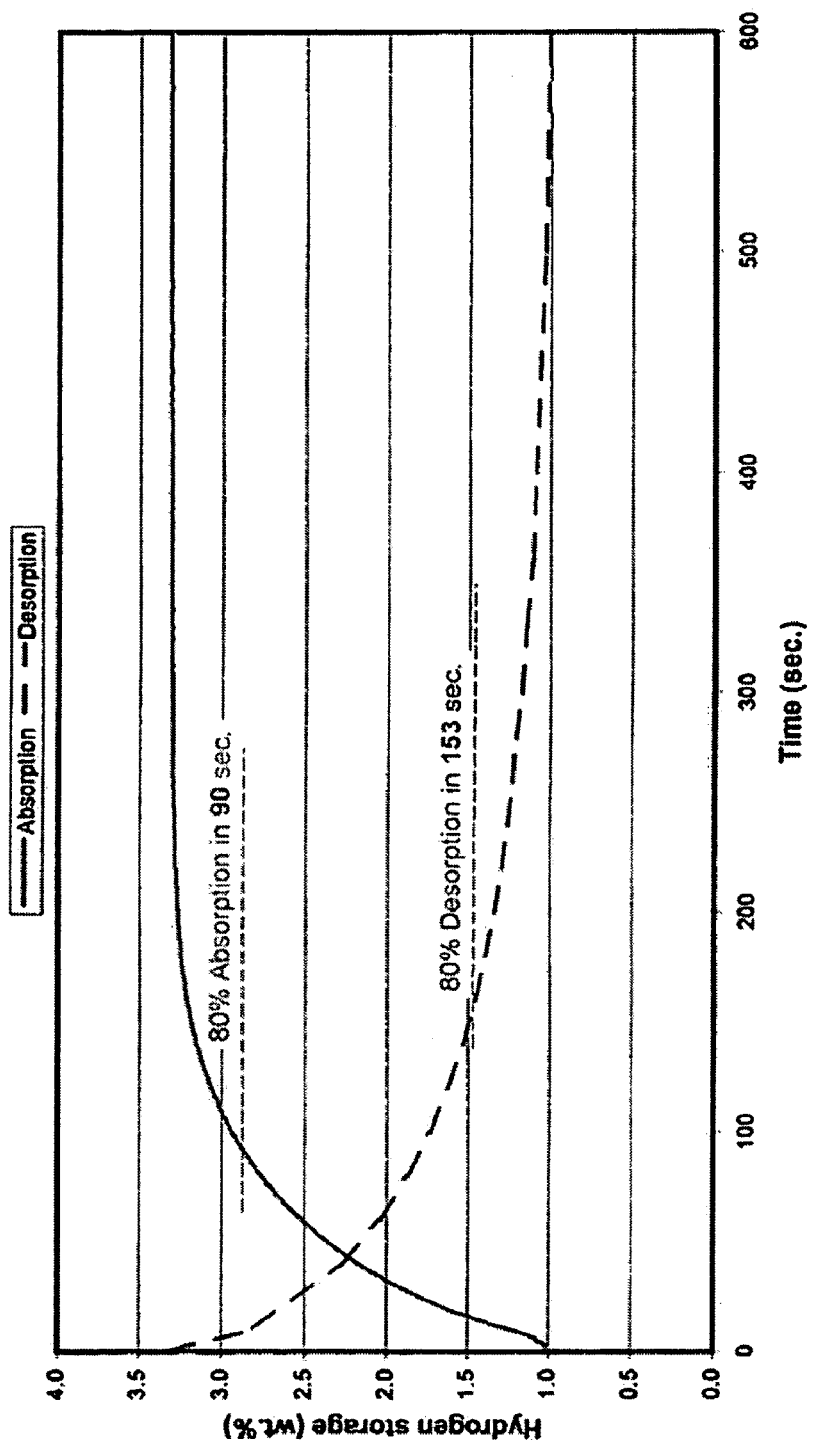
FIG. 13, shows the absorption/desorption rate for a medium vanadium alloy in accordance with the present invention.

To compare the absorption/desorption rates of the alloys of the present invention, a sample of a low vanadium alloy ($V_{10}Ti_{40}Cr_{50}$) and a sample of a medium vanadium alloy ($V_{23}Ti_{30}Cr_{41}Mn_3Fe_3$) were prepared via arc melting (as described earlier), annealed at 1400° C. for 5 minutes, and water quenched. The absorption/desorption rate for the low vanadium alloy is shown in FIG. 12, and the absorption/desorption rate for the medium vanadium alloy is shown in FIG. 13. The absorption/desorption rate for the low vanadium alloy were better than the absorption/desorption rate for the medium vanadium content alloy, however, in either case 80% absorption and desorption for either alloy can be obtained within 3 minutes.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A BCC hydrogen storage alloy processed to be substantially free of oxides, said alloy stably absorbing at least 80% of its hydrogen storage capacity within 90 seconds, desorbing at least 80% of its total hydrogen storage capacity within 30 seconds, and reversibly storing at least 2.2 weight percent hydrogen at 90° C., said alloy reversibly storing at least 1.5 weight percent hydrogen per cycle for at least 700 cycles.

2. The hydrogen storage alloy according to claim 1, wherein at least 85% of said hydrogen storage alloy reverts to a BCC crystal structure from a FCC crystal structure upon desorption of hydrogen from said hydrogen storage alloy.

3. The hydrogen storage alloy according to claim 1, wherein at least 90% of said hydrogen storage alloy reverts to a BCC crystal structure from a FCC crystal structure upon desorption of hydrogen from said hydrogen storage alloy.

4. The hydrogen storage alloy according to claim 1, wherein at least 95% of said hydrogen storage alloy reverts to a BCC crystal structure from a FCC crystal structure upon desorption of hydrogen from said hydrogen storage alloy.

5. The hydrogen storage alloy according to claim 1, wherein the lattice constant of said hydrogen storage alloy is in the range of 3.015 to 3.045 angstroms.

6. The hydrogen storage alloy according to claim 5, wherein the lattice constant of said hydrogen storage alloy is in the range of 3.015 to 3.028 angstroms.

7. The hydrogen storage alloy according to claim 5, wherein the lattice constant of said hydrogen storage alloy is in the range of 3.028 to 3.045 angstroms.

8. The hydrogen storage alloy according to claim 1, wherein the surface of said hydrogen storage alloy is substantially free of any oxides via low oxygen processing to inhibit and/or remove oxides at each step.

9. The hydrogen storage alloy according to claim 1, wherein said hydrogen storage alloy reversibly stores up to 2.83 weight percent hydrogen at 90° C.

10. The hydrogen storage alloy according to claim 1, wherein said alloy is cooled at a quench rate in the range of $10^2$ to $10^{3}$° C./second.

11. The hydrogen storage alloy according to claim 1, wherein said hydrogen storage alloy has a single phase BCC structure.

12. The hydrogen storage alloy according to claim 1, wherein said hydrogen storage alloy comprises:
    8.0 to 45 atomic percent titanium;
    5.0 to 75 atomic percent vanadium; and
    10 to 65 atomic percent chromium.

13. The hydrogen storage alloy according to claim 1, wherein said hydrogen storage alloy further comprises one or more modifier elements selected from nickel, manganese, molybdenum, aluminum, iron, silicon, magnesium, ruthenium, or cobalt, wherein said modifier elements are present in an amount greater than 0 up to 16 atomic percent.

14. The hydrogen storage alloy according to claim 8, wherein oxides are removed from said hydrogen storage alloy at each processing step.

15. The hydrogen storage alloy according to claim 8, wherein the formation of oxides on said hydrogen storage alloy are inhibited at each step.

16. The hydrogen storage alloy according to claim 1, wherein said hydrogen storage alloy comprises:
    10 to 65 atomic percent chromium.

17. A BCC hydrogen storage alloy processed to be substantially free of oxides, said alloy reversibly storing at least 1.5 weight percent hydrogen for at least 700 cycles.

* * * * *